United States Patent
Evans et al.

(10) Patent No.: US 6,690,918 B2
(45) Date of Patent: Feb. 10, 2004

(54) NETWORKING BY MATCHING PROFILE INFORMATION OVER A DATA PACKET-NETWORK AND A LOCAL AREA NETWORK

(75) Inventors: Michael Evans, Cupertino, CA (US); Robert Evans, Cupertino, CA (US); Charles Carinalli, Cupertino, CA (US); Gary Johnson, Cupertino, CA (US)

(73) Assignee: Soundstarts, Inc., Aromas, CA (US)

(*) Notice: Subject to any disclaimer, the term of this patent is extended or adjusted under 35 U.S.C. 154(b) by 581 days.

(21) Appl. No.: 09/755,768

(22) Filed: Jan. 5, 2001

(65) Prior Publication Data
US 2002/0090911 A1 Jul. 11, 2002

(51) Int. Cl.[7] ................................................. H04B 7/00
(52) U.S. Cl. .................. 455/41.2; 455/418; 379/201.02
(58) Field of Search .............................. 455/41.1–41.3, 455/418, 419, 420, 466, 426.1, 552.1, 557, 556.1, 556.2, 560; 379/201.02–201.04

(56) References Cited

U.S. PATENT DOCUMENTS

| | | | | |
|---|---|---|---|---|
| 6,289,218 B1 | * | 9/2001 | Liu | 455/426.1 |
| 6,405,027 B1 | * | 6/2002 | Bell | 455/403 |
| 6,484,027 B1 | * | 11/2002 | Mauney et al. | 455/421 |
| 6,493,550 B1 | * | 12/2002 | Raith | 455/422.1 |
| 2002/0022453 A1 | * | 2/2002 | Balog et al. | 455/41.2 |
| 2002/0080970 A1 | * | 6/2002 | Wingren | 455/41.3 |

* cited by examiner

Primary Examiner—Vivan Chin
Assistant Examiner—Charles Craver
(74) Attorney, Agent, or Firm—Donald R. Boys; Central Coast Patent Agency, Inc.

(57) ABSTRACT

A system for anonymously initiating communication between system-connected communications devices is provided wherein the initiation of communication results from comparison and priority matching of profile information shared between the devices. The system in one aspect comprises at least two communications devices connected to the system, the communications devices having at least a microprocessor, a data-input mechanism, a display screen, a wireless local-area-network protocol application enhanced with short-wave radio communication capability installed per instance to each of the devices, and a profile comparison and matching application installed per instance to each of the devices. When any two of the devices come into short-wave radio range of each other, the devices activated, a wireless local-area-network is established and the in-range devices swap profiles, which are compared to profiles held locally on each device such that a profile match registering on at least one device enables the device matching the profile to signal the sending device of the matched profile in order to request communication between the devices.

11 Claims, 4 Drawing Sheets

NETWORKING BY MATCHING PROFILE INFORMATION OVER A DATA PACKET-NETWORK AND A LOCAL AREA NETWORK

FIELD OF THE INVENTION

The present invention is in the field of network communications including Internet communications and pertains more particularly to methods for optimizing the networking experience for users by enabling priority profile matching as a predecessor to networking sessions.

BACKGROUND OF THE INVENTION

Capability for person-to-person communication has been enhanced greatly through recent development in wireless telephony and Internet technology. Anyone with a suitable wireless digital personal appliance or Internet appliance such as a personal computer with a standard Internet connection may access and communicate with other such equipped persons for the purpose of pleasure, business, or shared activities. There has also been great acceptance of technology for person-to-person communication with the purpose of making initial contact in an anonymous manner so as to provide two parties with a method of determining a desire (or lack) to further communicate semi-anonymously until the two parties decide to, or not to, meet face-to-face.

One problem that is encountered by an individual practicing this manner of communication is a lack of being able to immediately communicate with potentially desirable parties, and in many cases a lack of specific information as to the locality of a person to whom they might wish to communicate. Many prior-art services currently provide communication paths, such as Internet or newsprint personal advertisements, for example. These services provide a capability to respond but that capability is dependent on some time lapse between the time of placing the advertisement and receipt of responses to the advertisements. In these methods there is a considerable time lapse between the receipt of the response and initiating a reply to the initial interest.

In addition to the above, the profile information in such prior-art services is often sketchy and location information may indicate only a city or general geographic location. Time response using Internet paths is dependent on the person placing the advertisement to access the responses to their advertisement and reply. This may be accomplished in a matter of minutes or days depending on personal interests and habits. Time response in newsprint scenarios will take days or weeks depending on the time of placing the advertisement, publication timeframes, and reader search and response.

Another issue placing limitations on prior-art applications of personal communication services is the process in which the replies to personal advertisements are made. In the Internet application described above, one needs a PC or sophisticated digital appliance to search the personals services and reply usually via Internet to an interesting party. In the newsprint application, a responder most often has to reply to a cited telephone number or in some cases, send a letter to designated address. A significant limitation of current and prior-art services is the lack of availability of immediate and specific location information of the two parties utilizing a personal communications service.

A short-range radio technology system, known to the inventors as Blue tooth™, provides a capability for communications among digital devices using local wireless/cellular networks and the Internet and provides simplified data synchronization between such Net devices and computers.

Bluetooth™ firmware installed on a wireless device continually broadcasts and searches within a defined radius for other devices having Bluetooth™ technology capability. When such devices are "in range" they may communicate with one other. It has occurred to the inventors that this technology may be exploited and modified to provide meeting services based on profiling.

What is clearly needed is an Internet-enhanced networking system applicable to wireless technology that enables users to quickly locate interested parties based on priority profiling wherein profile matching and acceptance is a predecessor for communication and possibly meeting. Such a system greatly would greatly enhance any networking situation wherein it is desired to have knowledge of the participants before initiating non-anonymous communication.

SUMMARY OF THE INVENTION

In a preferred embodiment of the present invention, a method for initiating communication between at least two users of two or more users operating communications devices on a communications network, the communication advanced according to priority profile exchange and matching between the users is provided. The method comprises the steps of, (a) activating the communications devices to exchange profile information with each other, (b) receiving profiles, each communications device receiving profiles from other participating communications devices, (c) comparing the received profiles to local profiles stored on each of the participating communications devices, the matching performed according to priority criteria, (d) registering at least one match of profiles on at least one of the communications devices, (e) identifying the sending device of the highest priority profile matched and (f) initiating communication between the communications devices involved in the profile match, the communication initiated from the device registering the profile match.

In one aspect, the communications network comprises a local-area-network. In a preferred aspect, the local-area-network is a wireless network using short-wave radio technology. In this aspect of the method in step (a), activation of the communications devices and detection of other devices within range constitutes the local-area-network. In preferred aspects of the method in step (a), the communications devices have a microprocessor, a display, an input control mechanism, and a wireless local-area-network protocol embedded in the microprocessor. In one embodiment, the wireless local-area-network protocol is a firmware installable to the device. In another aspect of the method, the communications network comprises a local-area-network connected to a cellular telephone network accessible from the Internet network and wherein at least one of the communications devices is a Web-enabled cellular telephone. In one aspect of the method, a file server having a database connected thereto is provided on the Internet and adapted for performing steps (b) through (f) on behalf of the at least one Web-enabled cellular phone. In still another aspect of the method, the communications network further comprises a wireless data-packet-network connected to the local-area-network and accessible from the Internet network and wherein at least one of the communications devices is a Web-enabled hand-held computer. Further to the above, the Web-enabled hand-held computer is adapted to perform steps (c) through (f) on behalf of other communications devices. In a preferred aspect of the method in step (b), the received profiles are real profiles. In another aspect, in step (c), the local profiles are request profiles.

In another aspect of the present invention, a system for anonymously initiating communication between system-connected communications devices, the initiation of communication resulting from comparison and priority matching of profile information shared between the devices is provided. The system comprises, at least two communications devices connected to the system, the communications devices having at least a microprocessor, a data-input mechanism, a display screen, a wireless local-area-network protocol application enhanced with short-wave radio communication capability installed per instance to each of the devices and a profile comparison and matching application installed per instance to each of the devices. When any two of the devices come into short-wave radio range of each other, and the devices are activated, a wireless local-area-network is established and the in-range devices swap profiles, which are compared to profiles held locally on each device such that a profile match registering on at least one device enables the device matching the profile to signal the sending device of the matched profile in order to request communication between the devices.

In one aspect, the system is defined by the activity states of the in-range communications devices. In another aspect, the communications devices further include a voice communication capability using the short-wave radio technology. In one embodiment, the communications devices include Web-enabled cellular telephones. In another embodiment, the communications devices further include Web-enabled hand-held computers.

In one aspect, the system further comprises a computerized host node connected to the system. The host node is adapted for profile comparison and matching on behalf of the communications devices. In another aspect, the system further comprises a communications server maintained on the Internet and connected to the host node. The communications server is for storing profile information and for enabling system extension to remote Internet users accessing the server.

In one embodiment, the file server is accessible from the Web-enabled cellular telephones, from the Web-enabled hand-held computers, and from non-Internet capable communications devices functioning as peripherals through the computerized host node. In preferred application, the host node and the file server have an instance of the wireless local-area-network application and an instance of the profile comparison and matching application installed thereon for profile synchronization, comparison, and matching purposes. In still another embodiment, the wireless local-area-network application and the profile comparison and matching application are integrated as one application.

Now, for the first time, a networking system applicable to short-wave wireless technology is provided that enables users to quickly locate interested parties based on priority profiling. In some aspects the networking system is extensible into the Internet network enabling practice without geographic limitations. Such a system greatly enhances any networking situation wherein it is desired to have knowledge of the participants before initiating non-anonymous communication.

BRIEF DESCRIPTION OF THE DRAWING FIGURES

DESCRIPTION OF THE PREFERRED EMBODIMENTS

According to a preferred embodiment of the present invention, a unique system is provided and adapted to provide services to users who have a capability of using a wireless LAN to communicate directly via Net devices or to users having Internet access capability through wireless or cellular networks and devices. Such a system provides a location-sensitive prioritized profile-matching service for users with a method for accessing that information via handheld and personal digital appliances through a telephony interface direct to established databases. The methods and apparatus of the present invention are described in enabling detail below.

Figure 1:
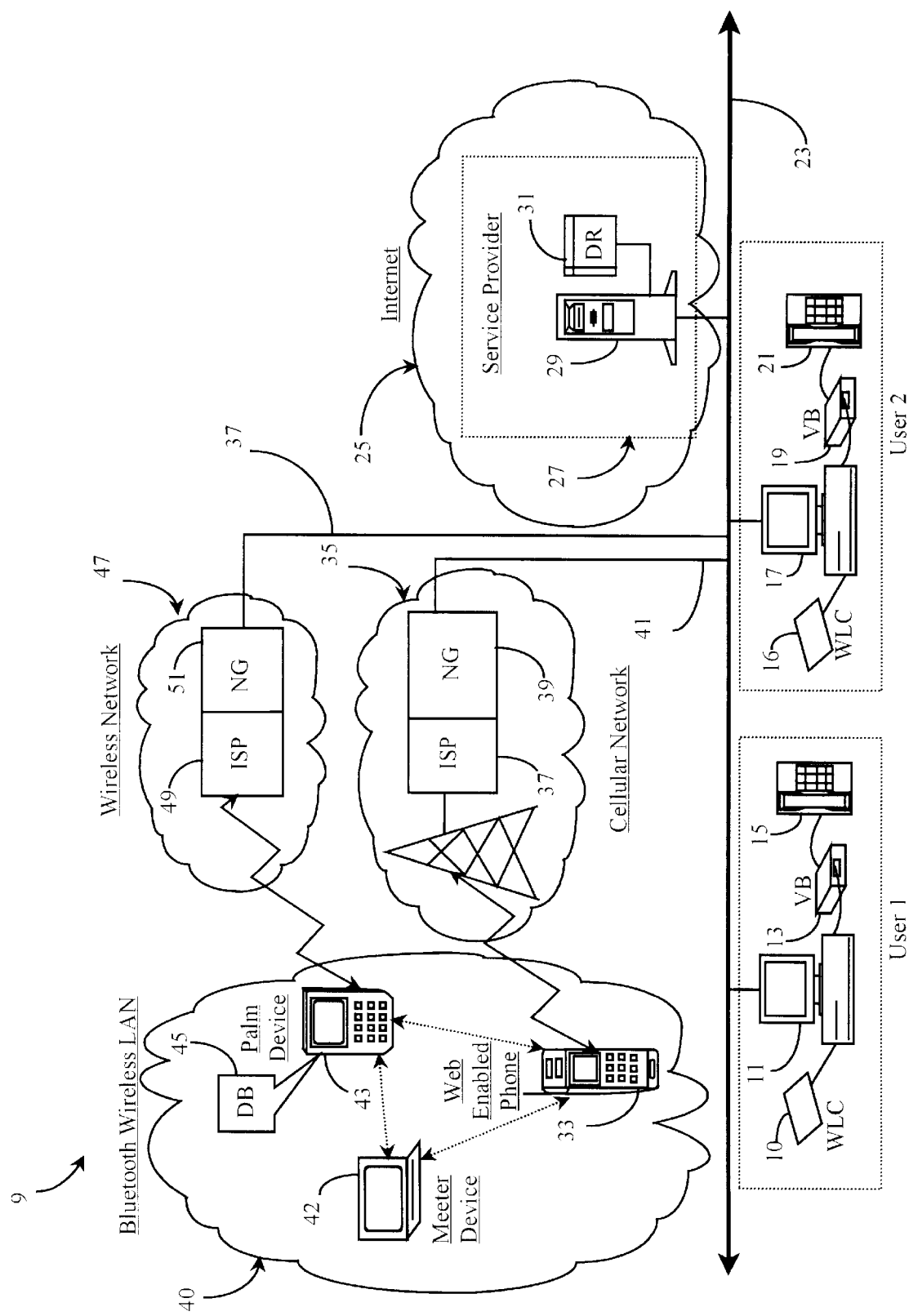
FIG. 1 is an architectural overview of a communication network wherein priority profile exchange is practiced as a predecessor to networking sessions according to an embodiment of the present invention.

FIG. 1 is an architectural overview of a communications network 9 wherein priority profile exchange is practiced as a predecessor to networking sessions according to an embodiment of the present invention.

Communications network 9 comprises a wireless local-area-network (LAN) 40, a wireless data network 47, a cellular network 35, a data-packet-network (Internet) 25, and exemplary users 1 and 2 connected by PC/Internet connection to an Internet backbone 23. LAN 40 is enabled, in this embodiment, by a technology known as Bluetooth™, which provides a communication protocol as well as firmware for local device communication.

Communications network 9 represents a variety of architectures for practicing the present invention according to a plurality of embodiments. Therefore, it is the intent of the inventor to first describe all of the represented devices and communication connections, and then to describe applicable paths and scenarios for practicing the present invention.

LAN 40, as described above, is existent according to Bluetooth™ technology in that communication exists only when there are more than one device activated within an acceptable vicinity (range) of each other. It may be assumed in this example, that LAN 40 is not fixed in any way, and that it becomes applicable whenever activated devices are within range of one another.

There are a variety of exemplary wireless communications devices illustrated within LAN 40. These are a handheld computer 43, a Web-enabled phone 33, and a wireless device 42, termed a "meeter" device, by the inventor. Meeter device 42 is a proprietary device especially adapted for practicing the present invention within the scope of a wireless LAN created using Bluetooth™ technology. In this embodiment, handheld device 43 and Web-enabled phone 33 are also adapted with Bluetooth™ technology.

Wireless devices 33, and 43 are standard devices having Internet-connection capability through respective network gateways. For example, palm device 43 may access Internet 25, also represented by backbone 23, via an Internet-service-provider (ISP) 49 illustrated within intermediary wireless network 47, and an associated network gateway (NG) 51 also illustrated within network 47. NG 51 is connected to backbone 23 by an Internet access line 37 enabling Internet connectivity and communication capability to device 43. Similarly, Web-enabled phone 33, which in this embodiment is a cellular telephone, accesses Internet 25 (backbone 23) through an illustrated communications tower, a connected ISP 37, and a network gateway (NG) 39 all illustrated within cellular network 35. NG 39 is connected to backbone 23 by an Internet access line 41 enabling Internet connectivity and communication capabilities to phone 33.

In this embodiment, meeter device 42, roughly the size of a credit card in a preferred embodiment, does not have Internet-access capabilities. Rather, device 42 may only communicate in limited fashion with other devices within limited radio range. As previously described above, LAN 40 represents wireless coverage over somewhat localized areas such as 10 to 100 meters in rough diameter. Therefore, devices 33, 42, and 45 may directly communicate, using radio signals, with one another only within an operable communication range defined within a cell area as described above.

Internet 25 represents a preferred data-packet-network for practicing the present invention according to variant embodiments. Internet backbone 23 represents all of the lines, equipment, and connection points making up Internet 25 as a whole. Therefore, there are no geographic limitations to the practicing the present invention. As LAN 40 represents just one local area created by virtue of active devices within range of one another, it will be appreciated that a great many such LANs may exist simultaneously, and may be distributed over a large region wherever two or more communication-capable devices come within range of one another.

Exemplary users 1 and 2 represent users operating from home premises using Internet backbone 23 as a conduit. Users 1 and 2 are identically equipped in this example. User 1 has a PC 11 for accessing the Internet through backbone 23 and standard Internet access capabilities as known in the art. The most common of these is dial-up/modem access achieved through an ISP. There are other possibilities as well. User 1 has a voice box (VB) 13 connected to PC 11 and a telephone 15 connected to VB 13. This configuration allows voice communication over an Internet connection utilizing a standard telephone. Such configurations are known in the art and available to the inventor. User 1 also has a wireless LAN card (WLC) 10 installed on PC 11. WLC 10 is a Bluetooth™ card in this example and adapts PC 11 as a Bluetooth™ communication device. User 2 is adapted identically as user 1 by way of a PC 17 connected to backbone 23, a VB 19 connected to PC 17, a telephone 21 connected to VB 19, and a WLC 16 installed on PC 17 enabling PC 17 as a Bluetooth™ device.

A service provider 27 is provided within Internet 25 and represents a central-control station for managing and propagating user profiles according to various embodiments of the present invention. Service provider 27 comprises a file server 29 and a connected data repository 31. File server 29 is adapted as a user-interfacing server for users operating any Internet-capable device including PCs 11 and 17, device 43 within LAN 40, and device 33 within LAN 40. Data repository 31 is adapted to store user profiles and other data about users such as device identification, subscriber information, account information and so on. Profile data included in repository 31 facilitates embodiments of the present invention, which comprises networking based on prioritized profile matching and exchange.

Software (not shown) provided to reside in server 29 and within repository 31 functions to match stored "real" profiles against "request" profiles and propagates selected profiles or notice thereof to participating and requesting devices using a networking protocol. The two separate types of profiles, real and request profiles, are created by users practicing the present invention. The inventor terms the profiles "self" (real) profiles and "meet" (request) profiles.

Various embodiments of the present invention are enabled in this example by various communication paths illustrated herein. Therefore users having varying intents may practice the invention using variant communications paths and obtain results accordingly. An important goal of the present invention is to provide users with an ability to "see" pertinent profiles (real) attributed to any other users before initiating committed contact in a way that enables quick contact and fulfills a variety of user interests.

For example, assume that LAN 40 exists by virtue of a plurality of users congregating at a popular nightclub while practicing the present invention. In this consideration, logical user intent would be to meet other users having desirable qualities purposeful of social interaction. Although not required, assume that the plurality of users all have devices identical to device 42. Device 42 is, in this scenario, a credit-card sized communication device enabled with Bluetooth™ technology as previously described. Device 42 can be similar in operation to a paging device and has at least a display screen, a limited key-pad, and a capability of receiving and sending messages from and to other like devices. In some embodiments device 42 may also be enhanced with limited range voice transmission and receiving capability.

In this simple example, Internet 25 and other illustrated networks and paths and equipment do not come in to play. Each device 42 has a relatively powerful microprocessor that enables users to configure and store real and request profiles, and enables each device to match received (real) profiles with profiles (request) already stored. Each user, before arriving at the particular nightclub, has configured at least one real profile and one request profile into his or her device 42. When users activate their devices at the nightclub, LAN 40 comes into existence as devices begin communicating with each other in the sharing and matching of profile information. For example, when one user comes into range of another, each device will send a real profile to the other device. These profiles are received by each participating device and matched against request profiles (what users are looking for) stored on each device. If a match, or in some embodiments, a partial match occurs, the device making the match beeps, vibrates, or alerts the user in some other fashion. The matching profile is displayed on the device with an option to contact the device that sent the matching profile. Contact may be similar to a page, or may be enhanced with voice communication capability in some embodiments.

In one embodiment of the present invention, a range of only 10 meters (about 32 feet) allows an optimum chance for user-identification of the owner of a device that sent a matching profile. When the range is 100 meters, there may be many more profiles being traded and matched lending necessity to device identification and paging capability. If a device is paged because of a matching profile, the owner of the device can see the real profile of the user operating the paging device. If desired, the owner may answer the page and identify him or herself. If the owner does not like the profile, then he or she need not answer. In one embodiment as described above device 42 is further enhanced with short-range voice capabilities allowing consenting users to speak with each other.

The above-described situation represents a simple embodiment wherein only users within range of each other may exchange profile information. It will be appreciated that this technology may be practiced in any location or dynamically, with users moving about.

In another example, consider that users are now operating hand-held devices such as hand-held device 43, and/or cellular phones such as phone 33. In this situation LAN 40 is enhanced with accessibility to the Internet network. A new dynamic comes into play in that users may now share profiles with each other and, in some cases, depending on device capability, receive and send profile information from and to server 29 at provider 27. Still further, Internet enhancement enables remote users to browse locations and associated profiles in order to determine which locations are good meeting places according to their request profiles.

To illustrate the Internet enhancement using the exemplary architecture and communication paths laid out in communications network 9, consider that users operating within LAN 40 at a nightclub are uploading their real profiles to server 29, which recognizes the nightclub as a local and popular club for singles. Devices 43 and 33 in this example may accomplish uploading of profile information.

Device 43 may upload profile information through ISP 49, NG 51, access line 37, backbone 23 into server 29. Server 29 temporarily stores the profile information from device 43 in database 31. Similarly, device 33 (cell phone) may upload profile information through cell tower and connected ISP 37, NG 39, access line 41, backbone 23 into server 29 whereupon the information is also stored in repository 31. Now, the profiles of the owners of devices 43 and 33 are available on-line to browsing members. Assume now that Users 1 and 2 have logged on to Internet 25 by accessing backbone 23 and are engaged in browsing of server 29. Users 1 and 2 may be looking for a popular spot locally where there is a good chance to meet someone in which they might be interested. User 2 may browse uploaded profiles of those users currently patronizing nightclub (LAN 40).

If interested, user 2 may download real profiles for matching with his or her request profile stored locally on PC 17. In another embodiment, user 2 may upload a request profile to server 29 and have it matched with real profiles stored in repository 31. In either case, if there are matches, user 2 may decide to travel to the popular nightclub with a Bluetooth™ enabled device similar to any of those illustrated within LAN 40. Alternatively, user 2 may select to send a notice and real profile to the owner of a device whose profile matched the request profile of user 2. In this case, remote communication may be established between user 2 and a user operating either device 43 or device 33 within LAN 40. User 1 has the same capability as described with respect to user 2. It is important to note herein that all real identification information such as names, phone numbers and the like are not provided during initial exchange in order to protect anonymity and privacy of users.

In another embodiment, one or more users may act as Internet hosts for other users if their devices have the required capabilities. In this situation, hand-held device 43, for example, is capable of storing many downloaded profiles as illustrated by a database (DB) 45 installed therein. Device 43 may share profiles locally, receive profiles from the Internet, and match them with other profiles of other users It is important to note that service provider 27 may interface with any user operating Internet-capable devices through server 29 in order to the receive profile information described above and, perhaps, location information comprising the name and the location of the nightclub. Server 29 stores this information in repository 31 tagged to the sending user identification.

In the above-described example wherein LAN 40 exists at a popular nightclub, for example, real (self) and request (meet) profiles reflect personal data such as appearance, interests, hobbies, income, marital status, and may include temporary information such as purpose for attending the nightclub. A request profile would essentially carry the same type of information. A request profile reflects a user's desired attributes in someone with whom they might consider socializing. In a nightclub, this information would tend to gravitate around dating and social interaction. For sports, people may meet for sailing, tennis, soccer, golf etc. or for someone to play games like bridge, pool, etc. In other situations, profiles may reflect business capabilities, items for sale, items wanted, or essentially any other information. It is important to note herein that service provider 27 may provide, through server 29, generic profile templates (electronic forms) for population and submission. In one embodiment, a user may create his or her own profiles having categories not already provided in a template.

Along with configuring and uploading profile information to server 29, a user may also signify a time period wherein the profiles may be considered active. For example, "activate this profile set from 6 pm to 11 pm tonight". As users arrive and begin to mingle at the particular location, such as a nightclub, an Internet host connected to server 29 begins communicating profile matches to users by beeping or buzzing the user's devices when a desirable match occurs within the vicinity of the host. This assumes, of course, that matching of profiles occurs at network level within server 29, or within the Internet host.

Meeter protocol (software) is integrated with Bluetooth™ firmware in order to enhance the former technology with the instructional capabilities for receiving and propagating profiles, matching profiles, and applying flexible "threshold" criteria set by users for defining and accepting a match. Using the protocol along with embedded LAN attributes of each device, up-linking to a central Web site and profile matching and propagation is enhanced with the one-touch data-sync capability offered by the wireless LAN synchronization protocol. In indicating a match, comparison need not be exact, and comparisons may be done in a manner to report, with an alert, a partial match, and in some cases the degree of a match, such as 70%, also the match degree of the other person may be provided.

Figure 2:
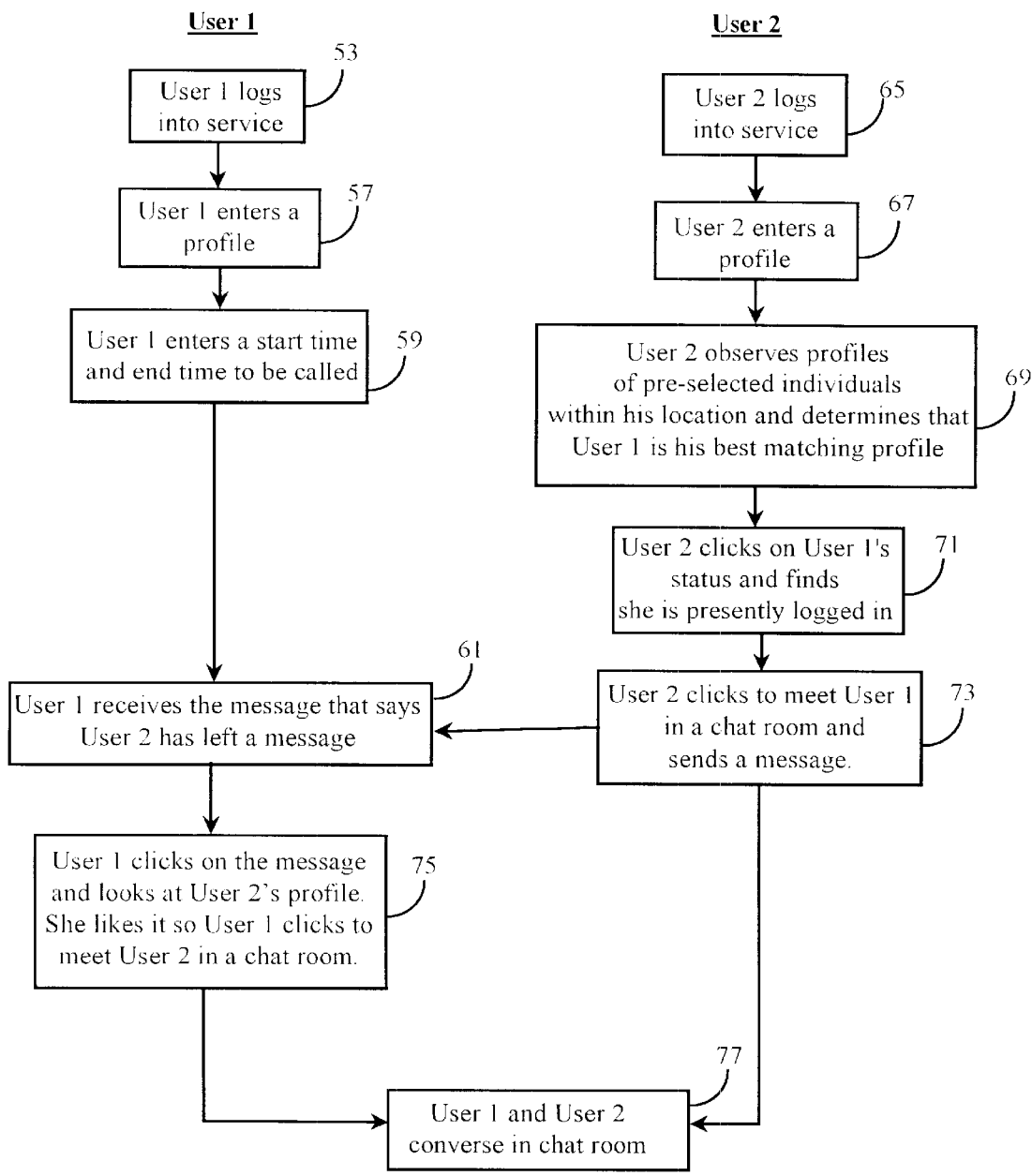
FIG. 2 is a flow chart illustrating logical steps of home PC to home PC communication using priority profile matching, according to an embodiment of the present invention.

FIG. 2 is an exemplary flow diagram representing home PC to home PC communication. At step 53, user 1 logs into the main Web-site, which in this case is service provider 27 of FIG. 1. At step 57, user 1 enters a profile of "self" and "meet" into a match server (server 29). At step 59, user 1 enters a start time and an end time to be called.

In a parallel effort, before, during or after user 1's action exemplified in steps 53–59, user 2 logs into the main Web-site at step 65. Once logged in and authenticated, user 2 enters a "self" and "meet" profile at step 67.

It is noted herein that users 1 and 2 are analogous to users 1 and 2 of FIG. 1 having VB capability and IP capabilities through respective PCs 11 and 17. At step 69 user 2, still logged into the main Web-site as described at step 65, observes available profiles of pre-selected individuals. The available profiles are priority-matched profiles of those persons within his location. Matching is accomplished by software capabilities established in server 29 of FIG. 1. The pre-selection also provides the location of pre-selected individuals and that the real profile of user 1 is the best (highest priority) match for the request profile information entered by user 2 at step 67.

At step 71, user 2 clicks on user 1's status and finds that user 1 is presently logged in to the service. At step 73, user 2 clicks the interactive indication and sends a message to user 1, the message to invite user 1 to meet in a chat room. The message technology used may be instant messaging, voice-mail, or other forms. It is important to note that the message is anonymous in that it does not reveal the sender ID or the receiver ID. At step 61, user 1 proactively receives the message indicating user 2 has left a message, or may receive a direct phone call. At step 75, user 1 accesses the message left by user 2 and reviews the real profile information of user 2, which is sent with the message. User 1 likes the information provided in user 2's profile and clicks the interactive indication to send a message to user 2 accepting the proposed meeting in a chat room. Concluding the initiation activity, user 1 and 2 meet and converse in a chat room at step 77. It is noted herein that all messaging between user 1 and 2 up until the point of final acceptance of user 1 to meet in a chat room is brokered by the service. Once in a chat room, which may be a private chat room, user 1 and 2 are left to their own devices. In other embodiments chat capability may be provided as a part of service provider 27.

This exemplary process represents just one of many possible interaction scenarios that may exist between Internet-connected PCs practicing networking according to priority profile matching. It will be apparent to one with skill in the art that the exact steps including communication mediums may be different without departing from the spirit and scope of the present invention. Such differences may be decided, for example IP phone instead of interactive chat, or dictated, for example one user cannot use a selected communication medium but can use another.

Also, matching profiles at step 69 is not limited to those profiles of people within any given location which may be local to a browsing user. Selecting those profiles within a given location only enhances the possibility of a physical meeting, which may or may not take place as the result of chat interaction.

Figure 3:
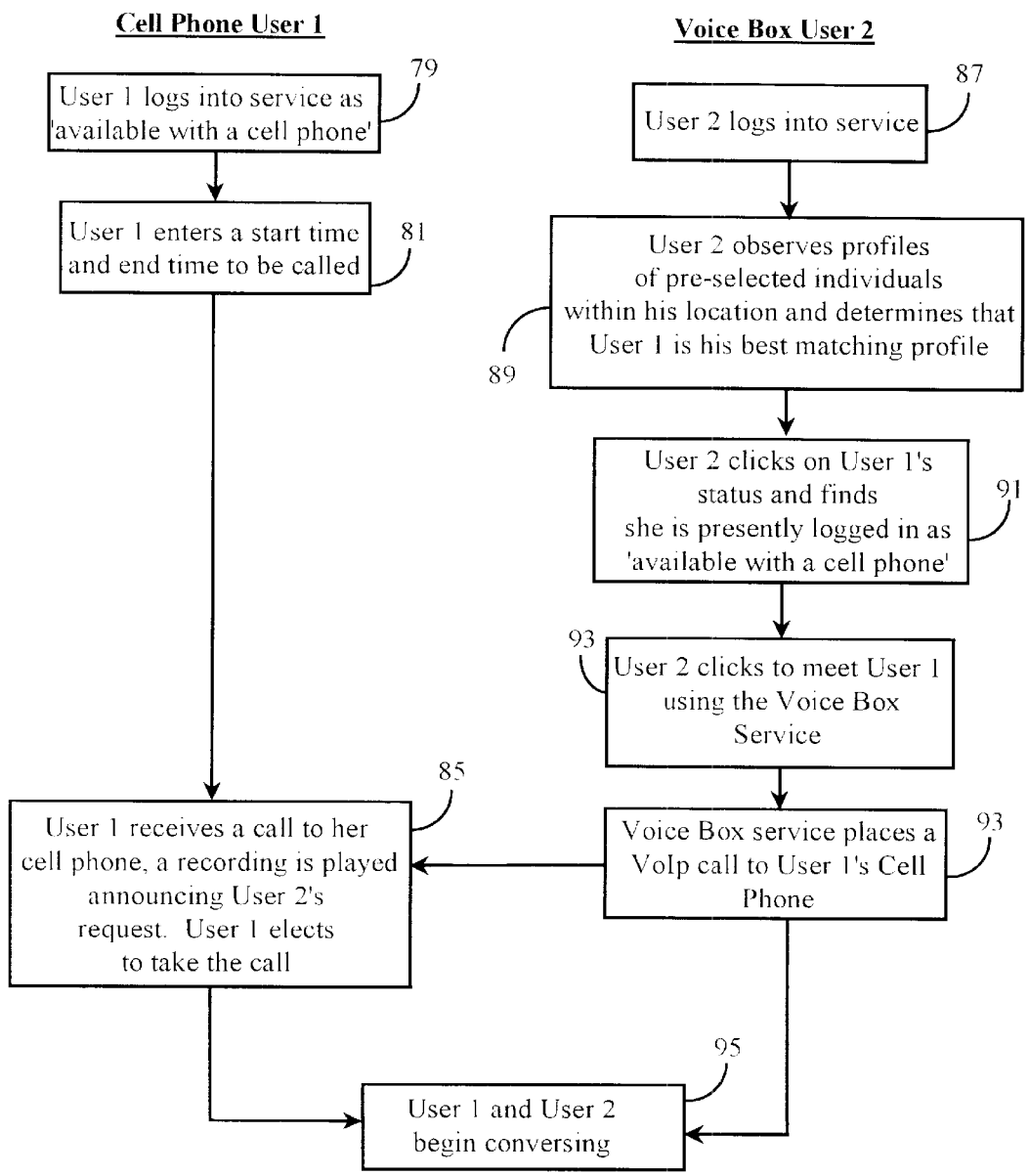
FIG. 3 is a flow chart illustrating logical steps of voice box to cell phone communication using priority profile matching according to an embodiment of the present invention.

FIG. 3 is an exemplary flow diagram representing voice box to cell phone communication. In this embodiment cell phone user 1 logs into the service as 'available with a cell phone' at step 79. In one embodiment of this mode, user 1 may be at one of a plurality of "known" establishments and is seeking interested parties that may be browsing the Web locally. User 1 enters a start time and end time to be called at step 81. It is noted herein that user 1 has entered or activated her selected profiles at the time of log-in at step 79.

In a parallel effort, user 2 logs into the service at step 87. User 2 also enters or activates selected profiles for matching. User 2 observes priority-matched profiles of individuals within the immediate or nearby locations and determines that user 1 best matches the request profile information activated by user 2. The profile matching is accomplished in the same manner as described in FIG. 2. User 2 then clicks on user 1's status and finds that person is presently logged in as 'available with a cell phone' at step 91. It may also be known to user 2 the location of user 1.

At step 93 user 2 clicks the interactive profile indication of user 1 and initiates a communication using a Voice Box (VB) analogous to VB 19 of FIG. 1. This action culminates in a voice over Internet protocol (VoIP) call placed to the cell phone of user 1 at step 94. User 1 receives a call on the target cell phone at step 85 and a voice recording is played announcing user 2's request. During the recording, the profile of user 2 is made available either through the recording, or displayed on the screen of the target phone. User 1, in this example, likes the profile of user 2 and elects to take the call in the same step 85. It is noted herein that all of the normal caller ID is not available through the VB service. In this way, the call from user 2 is made anonymously to user 1. Conversely, user 1 is anonymous to user 2 during the call request. Once user 1 elects to take the call, they may begin normal communication at step 95 and are left to their own devices. An implementation of this approach would allow a user to log in from home and register as just available, awaiting a call from a match.

This embodiment is similar to the one described in FIG. 2 except that one user is mobile and presumed to be located at a certain establishment. This is, however, not required in order to practice the present invention. A user, for example, in transit from one physical location to another may activate a "destination profile" any time before arrival. It is also noted herein that Bluetooth™ technology is not specifically required to practice the embodiments described in FIGS. 2 and 3. However, the technology enables the profile synchronization to proceed in a more efficient manner. Short-wave radio technology is not used unless profiles are exchanged locally.

Figure 4:
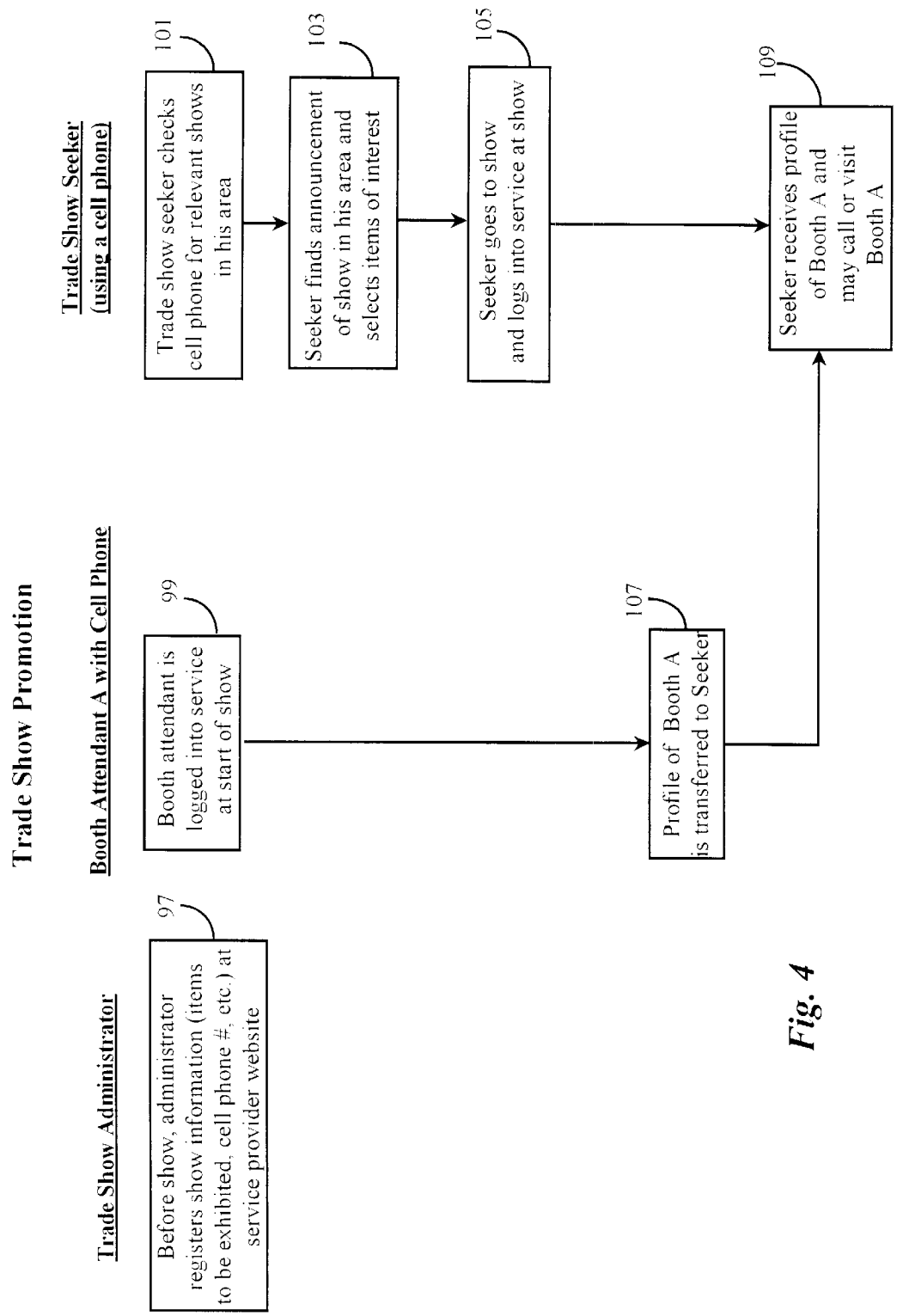
FIG. 4 is a flow chart illustrating logical steps of a trade show promotion using priority profile matching according to an embodiment of the present invention.

FIG. 4 is an exemplary flow diagram representing a trade show promotion wherein priority-profile matching is practiced according to an embodiment of the present invention. At step 97 a trade show administrator accesses the service (provider 27) of FIG. 1 prior to the date of the planned show and registers show "profile" information comprising exhibit information and contact information for represented booths exhibiting at the show. This information represents real profiles and is stored at the service in a data repository analogous to repository 31 of FIG. 1. Entering of information may be accomplished via a PC set-up at the show or from any remote location. In this case, general show information may include show themes, organizations to be represented, location and time/date parameters, and so on. Individual booth profiles may include items to be exhibited, services available, and cell phone numbers of exhibitors working the booths at pre-selected times. In one embodiment, one cell phone is made available at each booth.

At step 99, booth attendant A logs into the service at the beginning of the trade show. The profile information of the booth is already known by the service. In a parallel effort, a trade-show seeker/browser logs into the service with a Web-enabled cell phone at step 101 and browses for registered shows in the vicinity. At step 103, the trade-show browser locates an announcement of a relevant show in his area and reviews content of show information. In the same step, the trade-show seeker selects items of interest. This selection culminates a request profile entered by the trade-show seeker.

At step 105 the trade-show seeker arrives at the scheduled show and logs into the service. The service matches the items of interest (user profile) pre-entered at step 103 with the profile information of all of the participating booths. Profiles are delivered to the trade-show browser who is now at the location of the show at step 107. It is indicated in step 107 that the profile of booth A is the highest-ranking profile that matches the request profile configured at step 103. The trade-show seeker receives the profile information from Booth A on his or her cell phone including booth contact information and may call or visit the indicated booth at step 109. It is noted herein that booth profiles may also be stored locally (at each booth) on respective Bluetooth™ capable devices, and they may be sent to the trade-show seeker when he or she comes into range of each booth. In this case, the seeker's device may match the "real" booth profile against a "request" profile held locally on the seeker's device. If a booth profile significantly matches (according to threshold) the seeker's request profile, his or her device may beep or vibrate, or provide some other alert, indicating a match or a partial match. In the just-described case, a meeter device, cell phone, or hand-held device analogous to devices 33–43 of FIG. 1 may be used.

It will be apparent to one with skill in the art that the present invention may be practiced utilizing a variety of devices and communications paths exemplified in the example architecture of FIG. 1 without departing from the spirit and scope of the present invention. For example in a simplest embodiment "meeter" devices are used for short-range profile exchange and matching without benefit of Internet capabilities or host computers. In more advanced embodiments Internet held profiles may be accessed through Internet-capable and Bluetooth™ enabled devices, host computers, Bluetooth™ modems or network bridges and so on.

It will also be apparent to one with skill in the art that the method of the present invention may be tailored according to a number of service criteria such as for social networking, sports, hobbies, business networking, convention or trade show activity or other conceivable scenarios without departing from the spirit and scope of the present invention. The rules governing profile matching and profile storage including where profiles are matched are dictated somewhat by the intent of a specific service variation. In some cases real contact information is desired to be publicized and in some cases it is not.

It will further be apparent to one with skill in the art, that instant messages, following established Bluetooth wireless protocol and standard instant message protocol, can be propagated back and forth between utilizing members and activity providers without departing from the spirit and scope of the present invention.

The method and apparatus of the present invention may be practiced by private individuals operating on the Internet, private individuals creating local Bluetooth Wireless LANs, businesses operating on a compatible LAN connected to the Internet, and so on. This includes the use of cell phones. There are many customizable situations. The present invention as taught herein and above should be afforded the broadest of scope. The spirit and scope of the present invention is limited only by the claims that follow.

What is claimed is:

1. A method for initiating communication between at least two users of two or more users operating communications devices, at least one of which is a cellular telephone device, on a local area network (LAN) connected to a cellular telephone network having gateway access to the Internet network, the communication advanced according to priority profile exchange and matching between the users comprising the steps of:
    (a) activating the communications devices to exchange profile information with each other;
    (b) receiving profiles, each communications device receiving profiles from other participating communications devices, including the cellular telephone receiving profiles from a Web server in the Internet;
    (c) comparing the received profiles to local profiles stored on each of the participating communications devices or on the Web server in the Internet network, the matching performed according to priority criteria;
    (d) registering at least one match of profiles on at least one of the communications devices or on the Web server;
    (e) identifying the sending device of the highest priority profile matched either at the local device or at the Web server; and
    (f) initiating communication between the communications devices involved in the profile match, the communication initiated from the device registering the profile match or by the Web server.

2. The method of claim 1, wherein the local-area-network is a wireless network using short-wave radio technology.

3. The method of claim 2 wherein in step (a), activation of the communications devices and detection of other devices within range constitutes the local-area-network.

4. The method of claim 3 wherein in step (a), the communications devices have a microprocessor, a display, an input control mechanism, and a wireless local-area-network protocol embedded in the microprocessor.

5. The method of claim 4 wherein in step (a), the wireless local-area-network protocol is a firmware installable to the device.

6. The method of claim 5 wherein in step (b), the received profiles are real profiles.

7. The method of claim 6 wherein in step (c), the local profiles are request profiles.

8. The method of claim 1 wherein the communications network further comprises a wireless data-packet-network connected to the local-area-network and accessible from the Internet network and wherein at least one of the communications devices is a Web-enabled hand-held computer.

9. The method of claim 8 wherein the Web-enabled hand-held computer is adapted to perform steps (c) through (f) on behalf of other communications devices.

10. A system for anonymously initiating communication between system-connected communications devices including one or both of Web-enabled cellular telephones and Web-enabled hand-held computers having voice communication capability using short-wave radio technology, the initiation of communication resulting from comparison and priority matching of profile information shared between the devices comprising:
    at least two communications devices connected to the system, the communications devices having at least a microprocessor, a data-input mechanism, and a display screen;
    a wireless local-area-network protocol application enhanced with short-wave radio communication capability installed per instance to each of the devices;
    a computerized host node connected to the system, the host node enabled for profile comparison and matching on behalf of the communications devices and having a connection to a communications server also accessible by the communication devices, the server maintained on the Internet, the communications server for storing profile information and for enabling system extension to remote Internet users accessing the server; and
    a profile comparison and matching application installed per instance to each of the devices, to the host node and to the Internet file server, characterized in that when any two of the devices come into short-wave radio range of each other, with the devices activated, a wireless local-area-network is established and the in-range devices swap profiles, which are compared to profiles held locally on each device such that a profile match registering on at least one device enables the device matching the profile to signal the sending device of the matched profile in order to request communication between the devices.

11. The system of claim 10, wherein the wireless local-area-network application and the profile comparison and matching application are integrated as one application.

\* \* \* \* \*